United States Patent
Jiang et al.

(10) Patent No.: US 10,511,965 B2
(45) Date of Patent: Dec. 17, 2019

(54) METHOD AND SYSTEM FOR DOWNLOADING SOFTWARE BASED ON MOBILE TERMINAL

(71) Applicant: HuiZhou TCL Mobile Communication Co., Ltd., HuiZhou (CN)

(72) Inventors: Haihui Jiang, HuiZhou (CN); Bo Wang, HuiZhou (CN)

(73) Assignee: HuiZhou TCL Mobile Communication Co., Ltd., HuiZhou (CN)

( * ) Notice: Subject to any disclaimer, the term of this patent is extended or adjusted under 35 U.S.C. 154(b) by 0 days.

(21) Appl. No.: 16/313,473

(22) PCT Filed: Jun. 30, 2017

(86) PCT No.: PCT/CN2017/091228
§ 371 (c)(1),
(2) Date: Dec. 27, 2018

(87) PCT Pub. No.: WO2018/001365
PCT Pub. Date: Jan. 4, 2018

(65) Prior Publication Data
US 2019/0261170 A1      Aug. 22, 2019

(30) Foreign Application Priority Data
Jul. 1, 2016   (CN) .......................... 2016 1 0509055

(51) Int. Cl.
*H04W 12/08*   (2009.01)
*H04W 12/00*   (2009.01)
(Continued)

(52) U.S. Cl.
CPC .......... *H04W 12/0027* (2019.01); *G06F 8/61* (2013.01); *G06F 21/44* (2013.01); *G06F 21/51* (2013.01);
(Continued)

(58) Field of Classification Search
CPC ...................................................... H04W 12/00
See application file for complete search history.

(56) References Cited

U.S. PATENT DOCUMENTS

2010/0058317 A1   3/2010  Braams
2016/0072772 A1*  3/2016  Geigel ................... G06F 21/10
                                                                 713/164
2017/0085568 A1*  3/2017  Rolfe .................. H04L 63/0861

FOREIGN PATENT DOCUMENTS

CN    1570865      1/2005
CN    102056156    5/2011
(Continued)

OTHER PUBLICATIONS

International Search Report and the Written Opinion dated Aug. 30, 2017 From the International Searching Authority Re. Application No. PCT/CN2017/091228 and Its Translation of Search Report Into English. (10 Pages).

*Primary Examiner* — Michael T Vu (57) ABSTRACT

A system and method for downloading software is provided. When software is required to be downloaded to the mobile terminal, a software downloading tool on the computer terminal establishes a connection with the mobile terminal via a preloader port of the mobile terminal and sends a download agent to the mobile terminal. A preloader program of the mobile terminal checks whether the download agent is signed and encrypted by a private key matched with an RSA public key in the preloader program, and if yes, the mobile terminal utilizes the DA download agent to download the software. The method can effectively prevent illegal
(Continued)

tools from having communication capability with the mobile phone by USB connection for data deletion or tampering, and reduce the possibility that a hacker damages "limiting function" of the mobile phone.

13 Claims, 7 Drawing Sheets

(51) Int. Cl.
  *G06F 21/44* (2013.01)
  *G06F 21/51* (2013.01)
  *H04L 9/32* (2006.01)
  *G06F 8/61* (2018.01)
  *H04W 12/12* (2009.01)
(52) U.S. Cl.
  CPC ......... *H04L 9/3249* (2013.01); *H04W 12/001* (2019.01); *H04W 12/08* (2013.01); *H04W 12/1208* (2019.01)

(56) References Cited

FOREIGN PATENT DOCUMENTS

| | | |
|---|---|---|
| CN | 102171652 | 8/2011 |
| CN | 104102499 | 10/2014 |
| CN | 105975850 | 9/2016 |
| WO | WO 2018/001365 | 1/2018 |

* cited by examiner

METHOD AND SYSTEM FOR DOWNLOADING SOFTWARE BASED ON MOBILE TERMINAL

RELATED APPLICATIONS

This application is a National Phase of PCT Patent Application No. PCT/CN2017/091228 having International filing date of Jun. 30, 2017, which claims the benefit of priority of Chinese Patent Application No. 201610509055.4 filed on Jul. 1, 2016. The contents of the above applications are all incorporated by reference as if fully set forth herein in their entirety.

FIELD AND BACKGROUND OF THE INVENTION

The present invention relates to mobile terminal technologies, and more particularly, to a method and system for downloading software based on a mobile terminal.

Recently, market share of smartphones is larger and larger. Also, damage ability of hackers is increasing. A common damage approach "adb root" injects illegal data to control cell phones. Another approach is to delete or tamper hardware address data by means of download, and meanwhile inject new data to the cell phones to release specific limitation of the cell phones, such as a network blocking function. In existing cell phones, it is easy for hackers to use download tools to have communication capability with the cell phones by means of USB connection for data deletion or tampering, thereby damaging the "limiting function" of the cell phones.

Therefore, there is a need to further develop and improve the existing skills.

SUMMARY OF THE INVENTION

The technical problems to be solved in the present invention are that for the drawbacks in the existing arts, a method and system for downloading software based on a mobile terminal is provided to solve the problems in the existing mobile terminals that it is easy for a hacker to use download tools to have communication capability with cell phones by means of USB connection for data deletion or tampering, thereby damaging the "limiting function" of the cell phones.

To solve the technical problems, technical schemes provided by the present invention are described below.

A method for downloading software based on a mobile terminal, including:

(A) when software is required to be downloaded from a computer terminal to the mobile terminal, a software downloading tool on the computer terminal is controlled to establish a connection with the mobile terminal by means of a preloader port of the mobile terminal and to send a DA download agent to the mobile terminal;

(B) a preloader program of the mobile terminal checks whether the DA download agent is signed and encrypted by a private key which is matched with an RSA public key preset in the preloader program, and if yes, the mobile terminal starts the DA download agent and finishes downloading corresponding software.

In the method for downloading software based on the mobile terminal, before Step (A), the method includes:

(A0) the RSA public key is added in the preloader program of the mobile phone in advance.

In the method for downloading software based on the mobile terminal, the Step (A) includes:

(A1) when the mobile terminal is connected to the computer terminal via a Universal Serial Bus (USB) interface and when software is required to be downloaded from the computer terminal to the mobile terminal, the mobile terminal itself detects whether software has been installed;

(A2) when the software has been installed on the mobile terminal, the software downloading tool on the computer terminal is controlled to establish the connection with the mobile terminal by means of the preloader port of the mobile terminal;

(A3) the software downloading tool on the computer terminal sends the DA download agent to the mobile terminal.

In the method for downloading software based on the mobile terminal, the Step (A) further includes:

(A4) when the software is not installed on the mobile terminal, the software downloading tool on the computer terminal is controlled to establish a connection with the mobile terminal by means of a BROM port of the mobile terminal.

In the method for downloading software based on the mobile terminal, the Step (B) includes:

(B1) the preloader program of the mobile terminal checks whether the DA download agent is signed and encrypted by the private key which is matched with the RSA public key preset in the preloader program;

(B2) when the DA download agent is signed and encrypted by the private key which is matched with the RSA public key preset in the preloader program, the mobile terminal starts the DA download agent;

(B3) the software downloading tool loads corresponding downloaded software and sends them to the mobile terminal one by one;

(B4) the DA download agent copes with the downloaded software and stores the downloaded software in corresponding locations in a storage.

In the method for downloading software based on the mobile terminal, the Step (B) further includes:

(B4) when the download agent program is not signed and encrypted by the private key which is matched with the RSA public key preset in the preloader program, operations are terminated and error states are returned to the computer terminal.

In the method for downloading software based on the mobile terminal, the RSA public key is a 2048-bit public key.

A system for downloading software based on a mobile terminal, including:

a connection establishing module configured that when software is required to be downloaded from a computer terminal to the mobile terminal, a software downloading tool on the computer terminal is controlled to establish a connection with the mobile terminal by means of a preloader port of the mobile terminal and to send a DA download agent to the mobile terminal;

a software downloading module configured that a preloader program of the mobile terminal checks whether the DA download agent is signed and encrypted by a private key which is matched with an RSA public key preset in the preloader program, and if yes, the mobile terminal starts the DA download agent and finishes downloading corresponding software.

In the system for downloading software based on the mobile terminal, the connection establishing module includes:

a detecting unit configured that when the mobile terminal is connected to the computer terminal via a Universal Serial Bus (USB) interface and when software is required to be downloaded from the computer terminal to the mobile terminal, the mobile terminal itself detects whether software has been installed;

a connecting unit configured that when the software has been installed on the mobile terminal, the software downloading tool on the computer terminal is controlled to establish the connection with the mobile terminal by means of the preloader port of the mobile terminal;

a DA sending unit configured that the software downloading tool on the computer terminal sends the DA download agent to the mobile terminal.

In the system for downloading software based on the mobile terminal, the software downloading module includes:

a determining unit configured that the preloader program of the mobile terminal checks whether the DA download agent is signed and encrypted by the private key which is matched with the RSA public key preset in the preloader program;

a DA starting unit configured that when the DA download agent is signed and encrypted by the private key which is matched with the RSA public key preset in the preloader program, the mobile terminal starts the DA download agent;

a software sending unit configured that the software downloading tool loads corresponding downloaded software and sends them to the mobile terminal one by one;

a software storing unit configured that the DA download agent copes with the downloaded software and stores the downloaded software in corresponding locations in a storage.

Above all, the present invention provides a system and method for downloading software based on a mobile terminal. The method for downloading software based on a mobile terminal includes: when software is required to be downloaded from a computer terminal to the mobile terminal, a software downloading tool on the computer terminal is controlled to establish a connection with the mobile terminal by means of a preloader port of the mobile terminal and to send a DA download agent to the mobile terminal; a preloader program of the mobile terminal checks whether the DA download agent is signed and encrypted by a private key which is matched with an RSA public key preset in the preloader program, and if yes, the mobile terminal starts the DA download agent and finishes downloading corresponding software. The method for downloading software based on a mobile terminal can effectively prevent any illegal tool from having communication capability with the mobile phone by means of USB connection for data deletion or tampering, and greatly reduce the possibility that a hacker damages the "limiting function" of the mobile phone.

DESCRIPTION OF SPECIFIC EMBODIMENTS OF THE INVENTION

To make the objectives, technical schemes, and advantages of the present invention more clear and specific, the present invention is described in further detail below with reference to the embodiments in accompanying with the appending drawings. It should be understood that the specific embodiments described herein are merely for explaining the present invention and the present invention is not limited thereto.

Figure 1:
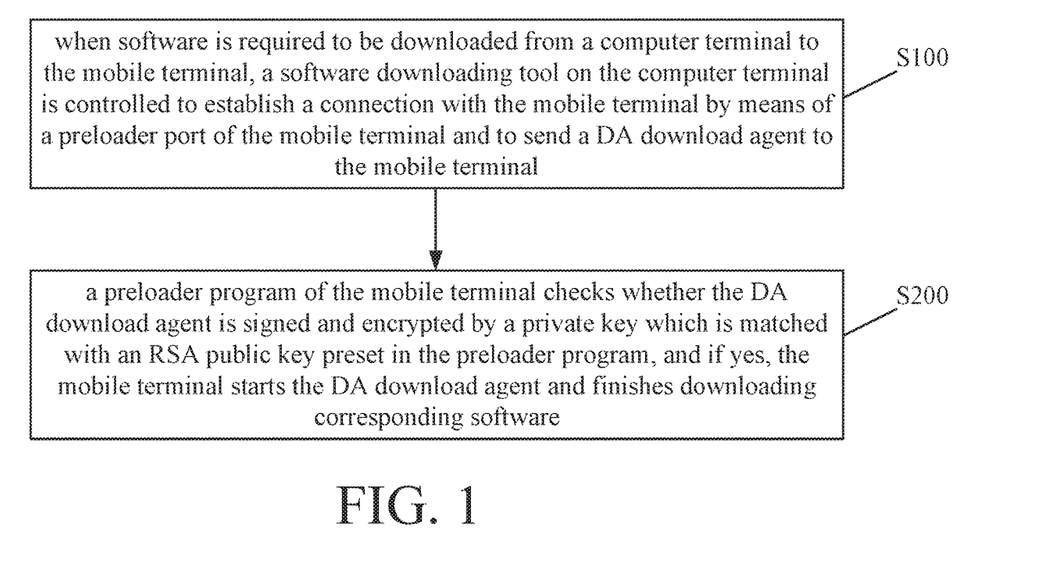
FIG. 1 is a flowchart of a method for downloading software based on a mobile terminal in accordance with a preferred embodiment of the present invention.

Please refer to FIG. 1. FIG. 1 is a flowchart of a method for downloading software based on a mobile terminal in accordance with a preferred embodiment of the present invention. The method for downloading software based on a mobile terminal as illustrated in FIG. 1 includes the followings.

In Step S100, when software is required to be downloaded from a computer terminal to the mobile terminal, a software downloading tool on the computer terminal is controlled to establish a connection with the mobile terminal by means of a preloader port of the mobile terminal and to send a DA download agent to the mobile terminal;

In Step S200, a preloader program of the mobile terminal checks whether the DA download agent is signed and encrypted by a private key which is matched with an RSA public key preset in the preloader program, and if yes, the mobile terminal starts the DA download agent and finishes downloading corresponding software.

The mobile terminal in embodiments of the present invention is illustrated by a cell phone as an example. Currently, in designing download mechanisms in various download tools including hacking tools in the market, they all need port access and transmitting download agents to authenticate cell phones and differentiate operation permission. The present invention adopts port verification techniques to control software download. The present invention primarily adds an RSA (asymmetric encryption) key (a public key configured in the preloader) in the preloader program of the cell phone. A terminal including an external tool needs to send the DA download agent to the cell phone. The DA download agent is configured to process reading, writing, erasing operations and so on, to EMMC/NAND memory. A download agent program (the DA download agent) is signed and encrypted by a corresponding RSA private key of the preloader. The DA download agent is sent to the cell phone, and can execute other authenticated functions as long as be authenticated by the preloader program.

Preloader software described in embodiments of the present invention is a launch program (a boot loader) in initial work procedures of the cell phone. The preloader port is referred to a port used to communicate with the preloader software. The DA download agent is a download agent program for storing data. RSA is an abbreviation for an international-standard asymmetric encryption algorithm. BROM is a load program for a central processing unit (CPU) chip, in which data is unerasable. A BROM port is referred to a port used to communicate with the BROM, and BROM communication is referred to communication between a computer and the CPU of the cell phone. All of these terms are well known in the technical field. In Step S100, when software is required to be downloaded from the computer terminal to the cell phone, the software downloading tool on the computer terminal is controlled to establish a connection with the cell phone by means of the preloader port of the cell phone, that is, only the preloader port is provided by the cell phone to communicate with the computer. When the communication is finished, the software downloading tool on the computer terminal sends the DA download agent to the cell phone.

Further, Step S100 specifically includes the followings.

In Step S110, when the mobile terminal is connected to the computer terminal via a Universal Serial Bus (USB) interface and when software is required to be downloaded from the computer terminal to the mobile terminal, the mobile terminal itself detects whether software has been installed. In embodiments of the present invention, when the USB interface is utilized to connect the cell phone and the computer, the cell phone itself detects whether to get the software.

In Step S120, when the software has been installed on the mobile terminal, the software downloading tool on the computer terminal is controlled to establish a connection with the mobile terminal by means of the preloader port of the mobile terminal. In embodiments of the present invention, the boot loader (i.e., the preloader) of the cell phone maps the preloader port to the computer terminal. The software downloading tool enables the port and establishes the connection.

In Step S130, the software downloading tool on the computer terminal sends the DA download agent to the mobile terminal. In embodiments of the present invention, the software downloading tool sends the DA download agent to the cell phone.

In above specific steps of Step S100, Step S110 is a key step. A hacker often deletes or tampers data by downloading illegal software to the cell phone to damage the "limiting function" of the cell phone. Accordingly, if the software has been installed on the cell phone, safety precautions should be adopted in a further step in order to avoid illegal deletion or tampering. Therefore, when the mobile terminal is connected to the computer terminal via the USB interface and software is required to be downloaded from the computer terminal to the mobile terminal, whether the software has been installed on (got by) the cell phone is first determined. When the software has been installed, the computer is forced to be mapped to the preloader port. That is, only the preloader port is provided to a communication port used between the cell phone and the software downloading tool of the computer in preparation for mandatory checks in a next step. Of course, if the software is determined to be not installed on the cell phone, it shows that the cell phone is initially blank and then there is no need to do mandatory checks for the downloading. It only needs to map the BROM port to the computer to enable communication between the computer and the CPU of the cell phone. That is to say, insecure chips do not need DA checks as described in the present invention. Accordingly, Step S100 further includes the followings.

In Step S140, when the software is not installed on the mobile terminal, the software downloading tool on the computer terminal is controlled to establish a connection with the mobile terminal by means of a BROM port of the mobile terminal.

In Step S200, the preloader program of the cell phone checks whether the DA download agent is signed and encrypted by the private key which is matched with the RSA public key preset in the preloader program, and if yes, the mobile terminal starts the DA download agent and finishes downloading corresponding software. That is, the boot loader (i.e., the preloader) of the cell phone checks the validity of the DA. In order to check the validity of the DA, it has to add the RSA public key in the preloader program of the cell phone in advance. Accordingly, in embodiments of the present invention, the followings are included before Step S100.

In Step S101, an RSA public key is added in the preloader program of the mobile phone in advance. Preferably, the RSA public key is a 2048-bit public key.

After the RSA public key is added in the preloader program of the cell phone, the RSA public key is used to match and decrypt the DA download agent. If the DA download agent has been authenticated, that is, the DA download agent has been signed and encrypted by a private key which is matched with the RSA public key, it can success in using the RSA public key to match and decrypt the DA download agent. It shows that the DA download agent has been authenticated, and thus the cell phone can start the DA download agent and then finishes downloading corresponding software. Of course, it is inevitable that the DA download agent has not been authenticated such that the verification is unsuccessful. Unauthenticated downloads are illegal downloads. When the verification fails, operations are terminated and error states are returned to the computer terminal in order to keep the security of cell phone data. Accordingly, Step S200 further includes the followings.

In Step S290, when the download agent program is not signed and encrypted by the private key which is matched with the RSA public key preset in the preloader program, operations are terminated and error states are returned to the computer terminal.

Further, Step S100 specifically includes the followings.

In Step S210, the preloader program of the mobile terminal checks whether the DA download agent is signed and encrypted by the private key which is matched with the RSA public key preset in the preloader program. That is, in the present embodiment, the boot loader of the cell phone checks the validity of the DA.

In Step S220, when the DA download agent is signed and encrypted by the private key which is matched with the RSA public key preset in the preloader program, the mobile terminal starts the DA download agent. That is, in the present embodiment, when the verification is successful, the cell phone starts the DA download agent.

In Step S230, the software downloading tool loads corresponding downloaded software and sends them to the mobile terminal one by one. In the present embodiment, the software downloading tool loads the software and sends them to the cell phone one by one.

In Step S240, the DA download agent copes with the downloaded software and stores the downloaded software in corresponding locations in a storage. In the present embodiment, the DA download agent finishes storing the software and writing it to a given location. In such a way, the cell phone finishes all software downloading.

The method for downloading software based on a mobile terminal in accordance with the present invention is also a software downloading protection technology. The present invention further provides first to five applied specific embodiments on the basis of the method for downloading software based on a mobile terminal. In the followings, the software downloading protection technology in accordance with the present invention is illustrated in four aspects, that is, software downloading and upgrade in internal research and development, external and third-party software upgrade, software downloading after manufacture and deliveries, and software upgrade in after-sales services. This can effectively increase the security of software downloading for the cell phone.

Figure 2:
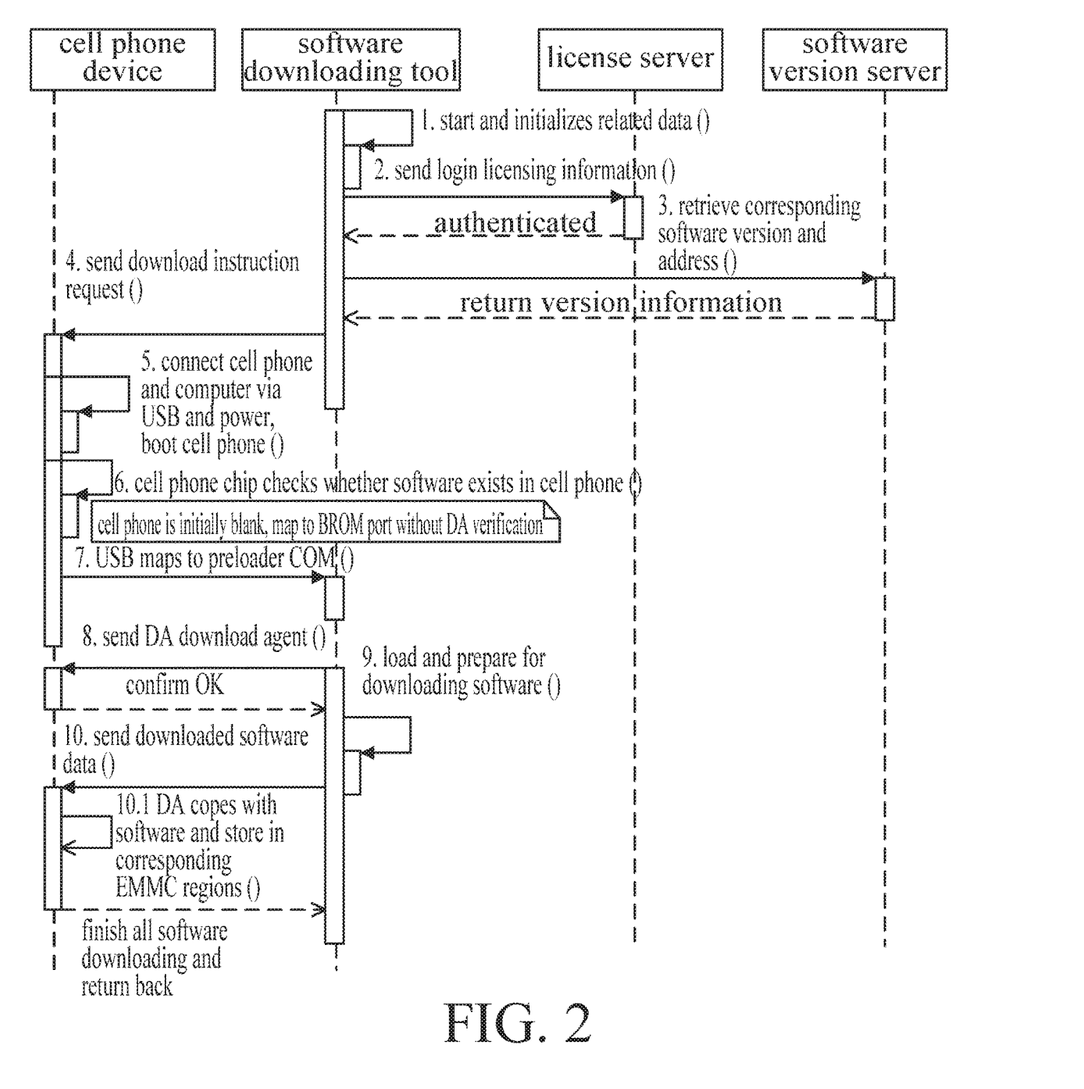
FIG. 2 is a schematic diagram illustrating principles of a method for downloading software based on a mobile terminal in accordance with a first applied specific embodiment of the present invention.

FIG. 2 is a downloading flow in a development phase inside a company. As shown in FIG. 2, the software downloading tool starts and initializes related data in advance, and sends login licensing information to a license server. When authenticated, the software downloading tool retrieves corresponding software version and address from a software version server. After that, a download instruction request is sent to the cell phone. Next, the cell phone is connected to the computer via the USB interface and is powered by the computer. The cell phone is booted and then a cell phone chip detects whether the software exists in the cell phone. Since the cell phone is initially blank, it will map the BROM port without DA verification, that is, USB maps to the BROM port (BROM COM). The software downloading tool sends the DA download agent to the cell phone. After confirmed by the cell phone, the software downloading tool loads and prepares for downloading the software. After that, downloaded software data is sent and the DA copes with the software and stores them to corresponding regions in the storage, thereby finishing all software downloading.

Figure 3:
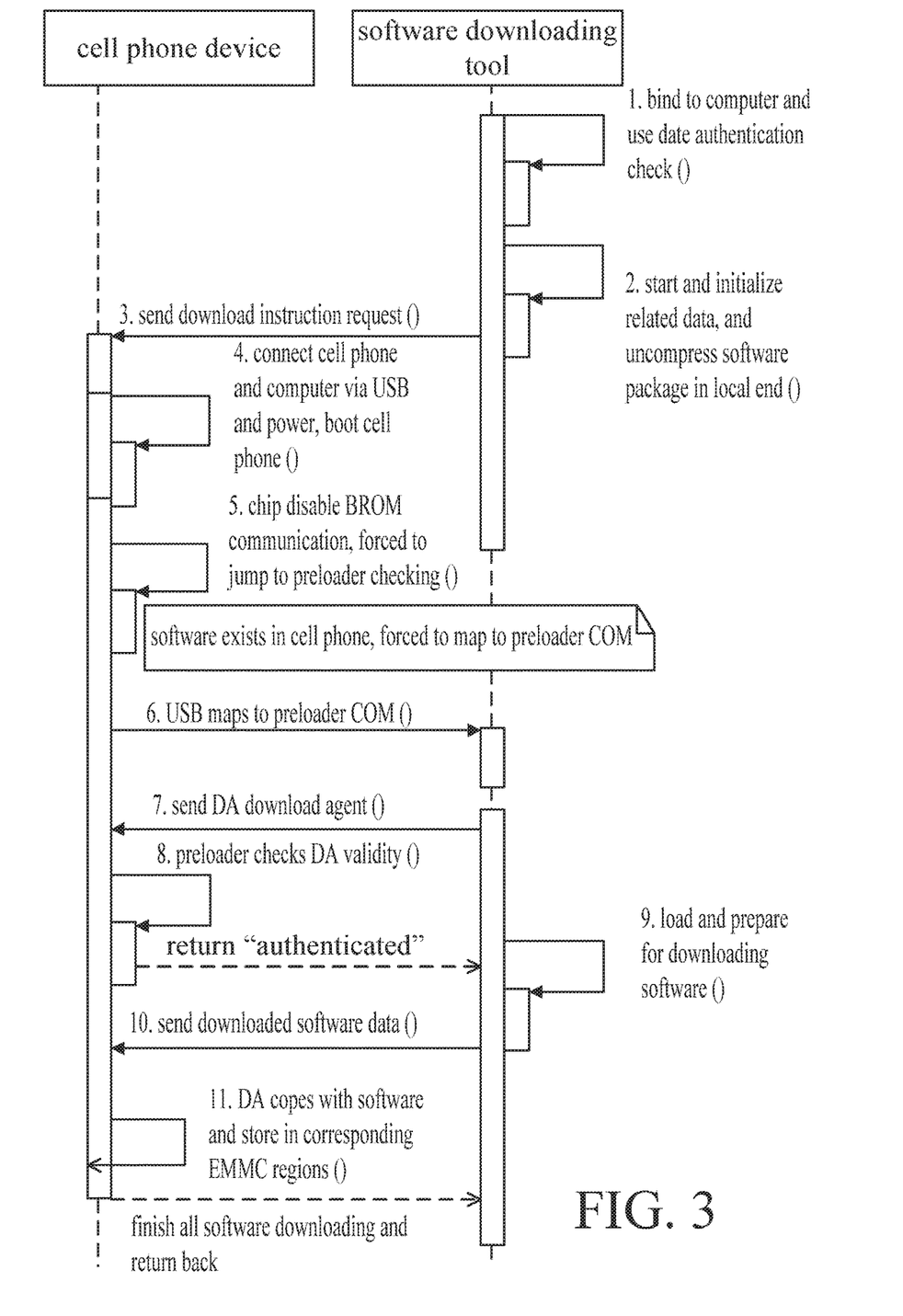
FIG. 3 is a schematic diagram illustrating principles of a method for downloading software based on a mobile terminal in accordance with a second applied specific embodiment of the present invention.

FIG. 3 is a software upgrade flow for external authentication and for a third-party terminal. Further, as shown in FIG. 3, the software downloading binds to the computer and is processed with date authorization checks in advance, and starts and initializes related data, and uncompresses a software package in local end. After that, a download instruction request is sent to the cell phone. Meanwhile, the cell phone is connected to the computer via the USB interface and is powered by the computer. The cell phone is booted. Since the software exists in the cell phone, the chip disables BROM communication. The process is forced to jump to the preloader checking. That is, USB maps to the preloader port (preloader COM). The software downloading tool sends the DA download agent. After that, the preloader checks the validity of the DA. When authenticated, the software downloading tool loads and prepares for downloading the software. After that, downloaded software data is sent to the cell phone and the DA copes with the software and stores them to corresponding regions in the (EMMC) storage, thereby finishing all software downloading.

Figure 4:
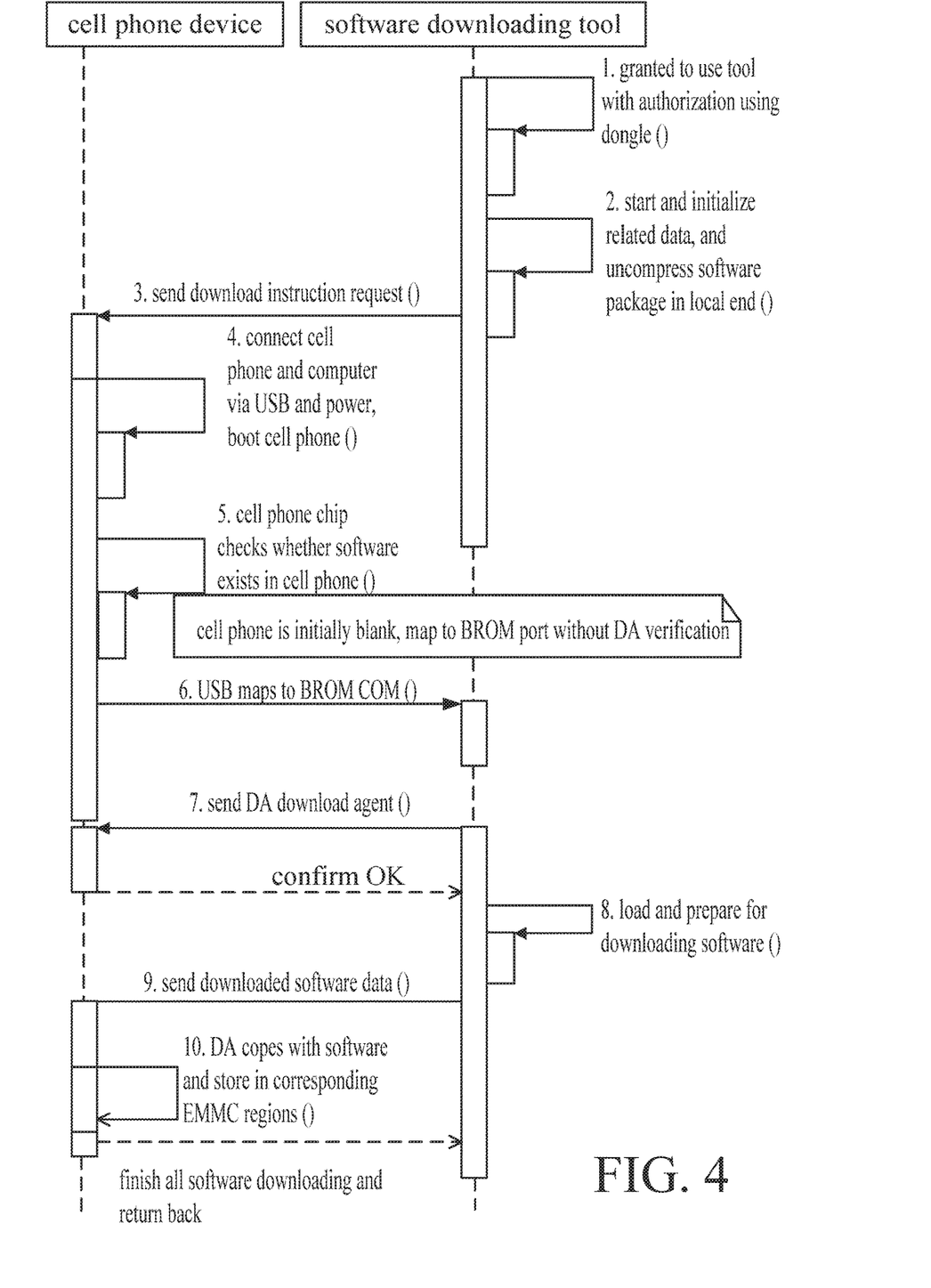
FIG. 4 is a schematic diagram illustrating principles of a method for downloading software based on a mobile terminal in accordance with a third applied specific embodiment of the present invention.

FIG. 4 is a flow in downloading MINI-version software for the first time. Further, as shown in FIG. 4, it is granted to use the software downloading tool with authorization using a dongle (PassDog) in advance. After that, the software downloading tool starts and initializes related data, and uncompresses a software package in local end and sends a download instruction request to the cell phone. Meanwhile, the cell phone is connected to the computer via the USB interface and is powered by the computer. The cell phone is booted and the cell phone chip detects whether the software exists in the cell phone. Since the cell phone is initially blank, it will not undergo the DA checking and thus USB maps to the BROM port. After that, the software downloading tool sends the DA download agent to the cell phone. After confirmed by the cell phone, the software downloading tool loads and prepares for downloading the software. After that, downloaded software data is sent to the cell phone and the DA copes with the software and stores them to corresponding regions in the storage, thereby finishing all software downloading.

Figure 5:
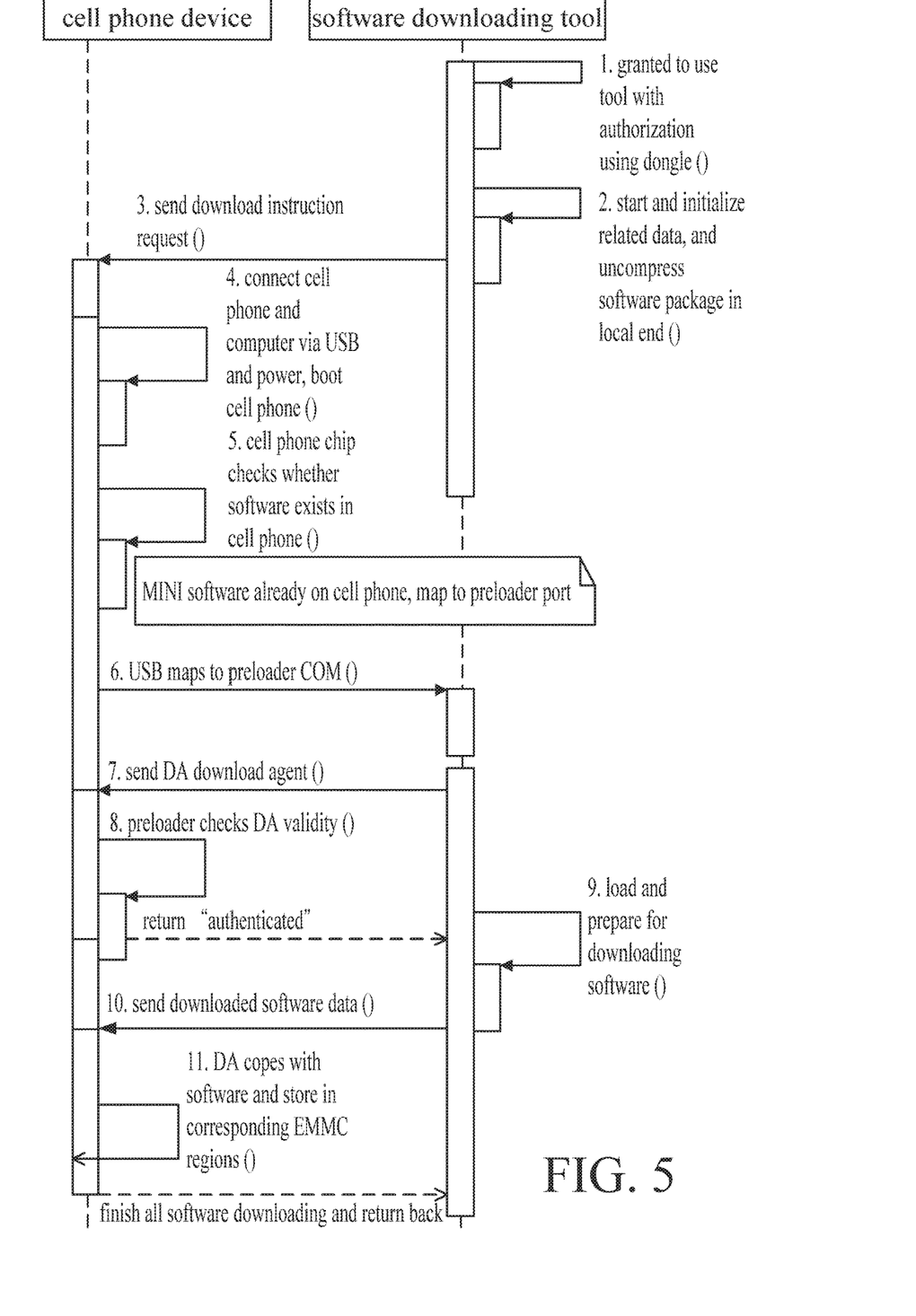
FIG. 5 is a schematic diagram illustrating principles of a method for downloading software based on a mobile terminal in accordance with a fourth applied specific embodiment of the present invention.

FIG. 5 is a flow in downloading customized-version software for the second time. Further, as shown in FIG. 5, it is granted to use the software downloading tool with authorization using a dongle (PassDog) in advance. After that, the software downloading tool starts and initializes related data, and uncompresses a software package in local end and sends a download instruction request to the cell phone. Meanwhile, the cell phone is connected to the computer via the USB interface and is powered by the computer. The cell phone is booted and the cell phone chip detects whether the software exists in the cell phone. Since MINI software has been already on the cell phone, USB will map to the preloader port. The software downloading tool sends the DA download agent. After that, the preloader checks the validity of the DA. When authenticated, the software downloading tool loads and prepares for downloading the software. After that, downloaded software data is sent to the cell phone and the DA copes with the software and stores them to corresponding regions in the (EMMC) storage, thereby finishing all software downloading.

Figure 6:
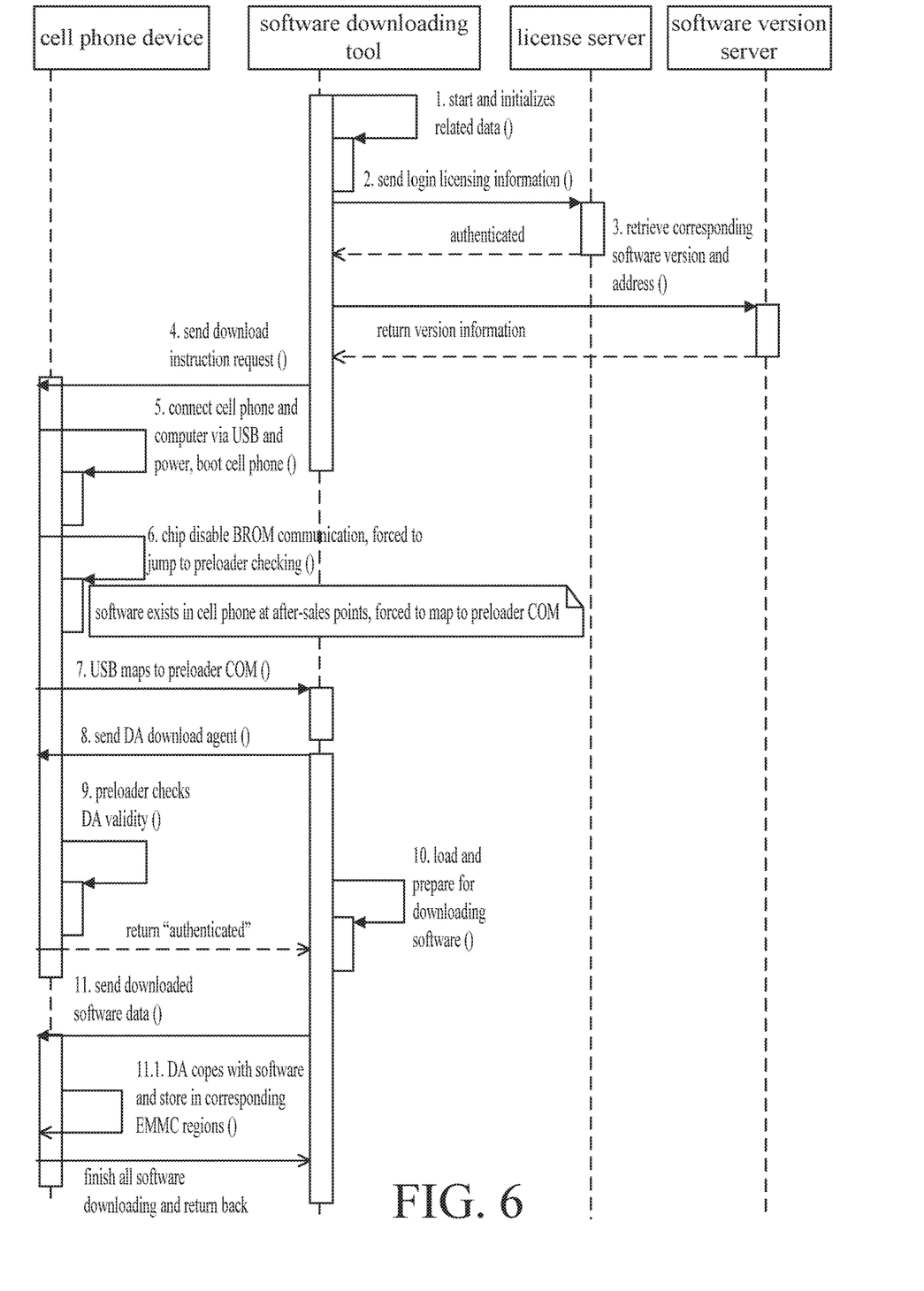
FIG. 6 is a schematic diagram illustrating principles of a method for downloading software based on a mobile terminal in accordance with a fifth applied specific embodiment of the present invention.

FIG. 6 is a flow in upgrading terminal software for after-sales service websites. Further, as shown in FIG. 6, the software downloading tool starts and initializes related data in advance, and sends login licensing information to a license server. When authenticated, the software downloading tool retrieves corresponding software version and address from a software version server. After that, a download instruction request is sent to the cell phone. Next, the cell phone is connected to the computer via the USB interface and is powered by the computer. The cell phone is booted and then the cell phone chip detects whether the software exists in the cell phone. Since the software exists in the cell phone at after-sales points, USB will map to the preloader port. The software downloading tool sends the DA download agent. After that, the preloader checks the validity of the DA. When authenticated, the software downloading tool loads and prepares for downloading the software. After that, downloaded software data is sent to the cell phone and the DA copes with the software and stores them to corresponding regions in the (EMMC) storage, thereby finishing all software downloading.

It can be seen from above applied specific embodiments that the method for downloading software based on a mobile terminal in accordance with the present invention can flexibly control software versions in development phase and in shipping or delivering. For internal versions in the development phase, port verification function is disabled and restricted. Temporal verification keys may be enabled for the tests run by an external system in temporal authentication and a flashing tool is released to restrict the computer and utilization date. A production system releasing software versions is changed with the newest encrypted verification key, and meanwhile renews the flashing tool and gives corresponding permissions.

The present invention introduces a new authentication key in a software mass-producing stage to abandon the keys that are temporarily set previously to make previously-provided external download tools invalid and make shipped terminals unable to upgrade and download software. The tools in developing systems can normally function only in internal networks. It ensures that the tools cannot normally function outside the company. In factory manufacture systems, the download tools need to be equipped with a dongle for connection authentication to be able to download software. Software from after-sales websites needs authentication and is upgraded with versions from a server in advance, and download verification is forced.

Therefore, the present invention provides a method for downloading software based on a mobile terminal. From point of view of download approaches, security data is modified and configured for the software of shipped cell phones to prevent any unauthenticated illegal tool from getting in so as to reduce the possibility that a hacker damages the "limiting function" of the cell phones.

Those skilled in the art shall understand that all or parts of the steps in the above method embodiments may be achieved by commanding the related hardware with programs. The programs may be stored in a computer readable storage medium, and the programs may include flows in each of above method embodiments when executed. The storage medium can be magnetic disks, optical discs, read-only memory (ROM), random access memory (RAM), and so on.

Figure 7:
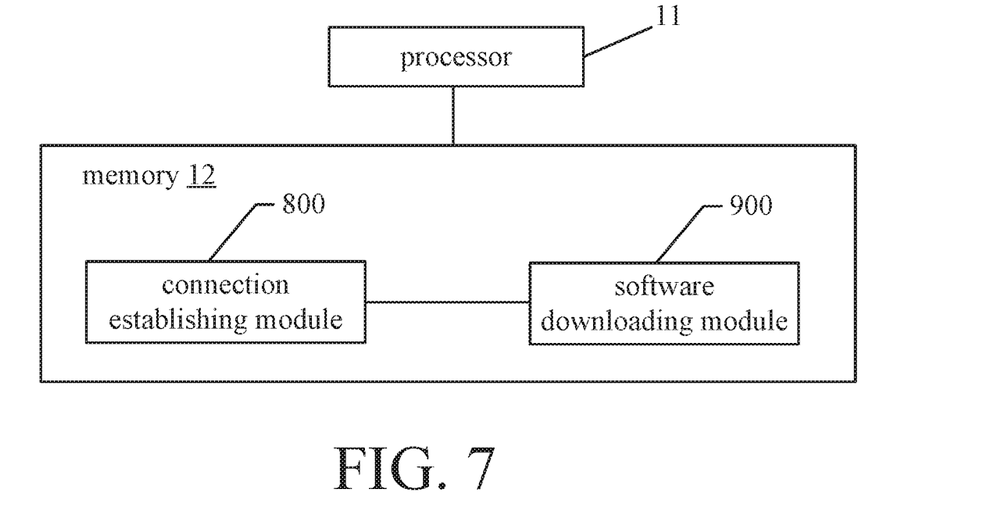
FIG. 7 is a functional block diagram showing a system for downloading software based on a mobile terminal in accordance with a preferred embodiment of the present invention.

Based on above method embodiments, embodiments of the present invention further provide a system for downloading software based on a mobile terminal. As shown in FIG. 7, the system may include a processor 11 and a memory 12. The memory 12 is used for storing instructions. The processor 11 is coupled to the memory 12, and is used to execute the instructions stored inside the memory 12. The instructions may include a connection establishing module 800 and a software downloading module 900. All of the modules 800 and 900, and other modules or units as introduced below, are instructions executable by the processor 11 to perform corresponding functions.

The connection establishing module 800 is configured that when software is required to be downloaded from a computer terminal to the mobile terminal, a software downloading tool on the computer terminal is controlled to establish a connection with the mobile terminal by means of a preloader port of the mobile terminal and to send a DA download agent to the mobile terminal. Details for this are described as above.

The software downloading module 900 is configured that a preloader program of the mobile terminal checks whether the DA download agent is signed and encrypted by a private key which is matched with an RSA public key preset in the preloader program, and if yes, the mobile terminal starts the DA download agent and finishes downloading corresponding software. Details for this are described as above.

Further, the connection establishing module 800 includes the followings.

A detecting unit is configured that when the mobile terminal is connected to the computer terminal via a Universal Serial Bus (USB) interface and when software is required to be downloaded from the computer terminal to the mobile terminal, the mobile terminal itself detects whether software has been installed. Details for this are described as above.

A connecting unit is configured that when the software has been installed on the mobile terminal, the software downloading tool on the computer terminal is controlled to establish the connection with the mobile terminal by means of the preloader port of the mobile terminal. Details for this are described as above.

A DA sending unit is configured that the software downloading tool on the computer terminal sends the DA download agent to the mobile terminal. Details for this are described as above.

Further, the software downloading module 900 includes the followings.

A determining unit is configured that the preloader program of the mobile terminal checks whether the DA download agent is signed and encrypted by the private key which is matched with the RSA public key preset in the preloader program. Details for this are described as above.

A DA starting unit is configured that when the DA download agent is signed and encrypted by the private key which is matched with the RSA public key preset in the preloader program, the mobile terminal starts the DA download agent. Details for this are described as above.

A software sending unit is configured that the software downloading tool loads corresponding downloaded software and sends them to the mobile terminal one by one. Details for this are described as above.

A software storing unit is configured that the DA download agent copes with the downloaded software and stores the downloaded software in corresponding locations in a storage. Details for this are described as above.

Above all, the present invention provides a system and method for downloading software based on a mobile terminal. The method for downloading software based on a mobile terminal includes: when software is required to be downloaded from a computer terminal to the mobile terminal, a software downloading tool on the computer terminal is controlled to establish a connection with the mobile terminal by means of a preloader port of the mobile terminal and to send a DA download agent to the mobile terminal; a preloader program of the mobile terminal checks whether the DA download agent is signed and encrypted by a private key which is matched with an RSA public key preset in the preloader program, and if yes, the mobile terminal starts the DA download agent and finishes downloading corresponding software. The method for downloading software based on a mobile terminal can effectively prevent any illegal tool from having communication capability with the mobile phone by means of USB connection for data deletion or tampering, and greatly reduce the possibility that a hacker damages the "limiting function" of the mobile phone.

It should be understood that the application of the present invention is not limited to the above-described examples. Those of ordinary skill in the art may make modifications or variations according to the above descriptions, but all such modifications and variations should be within the appended claims.

What is claimed is:

1. A method for downloading software based on a mobile terminal, comprising:
    (A) when software is required to be downloaded from a computer terminal to the mobile terminal, a software downloading tool on the computer terminal is controlled to establish a connection with the mobile terminal by means of a preloader port of the mobile terminal and to send a DA download agent to the mobile terminal; and
    (B) a preloader program of the mobile terminal checks whether the DA download agent is signed and encrypted by a private key which is matched with a Rivest-Shamir-Adleman (RSA) public key preset in the preloader program, and if yes, the mobile terminal starts the DA download agent and finishes downloading corresponding software, wherein the Step (B) comprises:
- (B1) the preloader program of the mobile terminal checks whether the DA download agent is signed and encrypted by the private key which is matched with the RSA public key preset in the preloader program;
- (B2) when the DA download agent is signed and encrypted by the private key which is matched with the RSA public key preset in the preloader program, the mobile terminal starts the DA download agent;
- (B3) the software downloading tool loads corresponding downloaded software and sends them to the mobile terminal one by one; and
- (B4) the DA download agent copes with the downloaded software and stores the downloaded software in corresponding locations in a storage.

2. The method according to claim 1, wherein before Step (A), the method comprises:
- (A0) the RSA public key is added in the preloader program of the mobile phone in advance.

3. The method according to claim 1, wherein the Step (A) comprises:
- (A1) when the mobile terminal is connected to the computer terminal via a Universal Serial Bus (USB) interface and when software is required to be downloaded from the computer terminal to the mobile terminal, the mobile terminal itself detects whether software has been installed;
- (A2) when the software has been installed on the mobile terminal, the software downloading tool on the computer terminal is controlled to establish the connection with the mobile terminal by means of the preloader port of the mobile terminal; and
- (A3) the software downloading tool on the computer terminal sends the DA download agent to the mobile terminal.

4. The method according to claim 3, wherein the Step (A) further comprises:
- (A4) when the software is not installed on the mobile terminal, the software downloading tool on the computer terminal is controlled to establish a connection with the mobile terminal by means of a boot ROM (BROM) port of the mobile terminal.

5. The method according to claim 1, wherein the Step (B) further comprises:
- (B5) when the download agent program is not signed and encrypted by the private key which is matched with the RSA public key preset in the preloader program, operations are terminated and error states are returned to the computer terminal.

6. The method according to claim 1, wherein the RSA public key is a 2048-bit public key.

7. A system for downloading software based on a mobile terminal, comprising:
- a processor; and
- a memory connected with processor, the memory comprising a plurality of program instructions executable by the processor, the plurality of program instructions comprising:
  - (A) when software is required to be downloaded from a computer terminal to the mobile terminal, a software downloading tool on the computer terminal is controlled to establish a connection with the mobile terminal by means of a preloader port of the mobile terminal and to send a DA download agent to the mobile terminal; and
  - (B) a preloader program of the mobile terminal checks whether the DA download agent is signed and encrypted by a private key which is matched with a Rivest-Shamir-Adleman (RSA) public key preset in the preloader program, and if yes, the mobile terminal starts the DA download agent and finishes downloading corresponding software, wherein Portion (B) comprises:
- (B1) the preloader program of the mobile terminal checks whether the DA download agent is signed and encrypted by the private key which is matched with the RSA public key preset in the preloader program;
- (B2) when the DA download agent is signed and encrypted by the private key which is matched with the RSA public key preset in the preloader program, the mobile terminal starts the DA download agent;
- (B3) the software downloading tool loads corresponding downloaded software and sends them to the mobile terminal one by one; and
- (B4) the DA download agent copes with the downloaded software and stores the downloaded software in corresponding locations in a storage.

8. The system according to claim 7, wherein Portion (A) comprises:
- (A1) when the mobile terminal is connected to the computer terminal via a Universal Serial Bus (USB) interface and when software is required to be downloaded from the computer terminal to the mobile terminal, the mobile terminal itself detects whether software has been installed;
- (A2) when the software has been installed on the mobile terminal, the software downloading tool on the computer terminal is controlled to establish the connection with the mobile terminal by means of the preloader port of the mobile terminal; and
- (A3) the software downloading tool on the computer terminal sends the DA download agent to the mobile terminal.

9. A method for downloading software based on a mobile terminal, comprising:
- connecting the mobile terminal to a computer terminal via a wired interface for downloading software from the computer terminal to the mobile terminal;
- establishing by a software download tool on the computer terminal a connection with the mobile terminal by means of a preloader port of the mobile terminal;
- sending by the software download tool a download agent to the mobile terminal by means of communication using the preloader port;
- checking by a preloader program of the mobile terminal whether the download agent is signed and encrypted by a private key which is matched with a public key set in the preloader program; and
- in response to that the download agent is signed and encrypted by the private key which is matched with the public key set in the preloader program, starting the download agent by the mobile terminal and loading the software to the mobile terminal by the software download tool, wherein the software downloading tool loads corresponding downloaded software and sends them to the mobile terminal one by one, and the DA download agent copes with the downloaded software and stores the downloaded software in corresponding locations in a storage.

10. The method according to claim 9, further comprising:
- checking by the mobile terminal whether the software is installed on the mobile terminal;
- in response to that the software is installed on the mobile terminal, establishing by the software download tool the connection with the mobile terminal by means of the preloader port of the mobile terminal; and in response to that the software is not installed on the mobile terminal, establishing by the software download tool a connection with the mobile terminal by means of a boot ROM (BROM) port of the mobile terminal.

11. The method according to claim 9, wherein the wired interface is a Universal Serial Bus (USB) interface.

12. The method according to claim 9, wherein the public key is a Rivest-Shamir-Adleman (RSA) public key.

13. The method according to claim 9, further comprising:

in response to that the download agent is not signed and encrypted by the private key which is matched with the public key set in the preloader program, terminating any download operation and sending error states from the mobile terminal to the computer terminal.

* * * * *